United States Patent
Fischer

(10) Patent No.: US 9,703,329 B2
(45) Date of Patent: Jul. 11, 2017

(54) DRIVER DEVICE DETECTION

(71) Applicant: Myine Electronics, Inc., Ferndale, MI (US)

(72) Inventor: Joel J. Fischer, Royal Oak, MI (US)

(73) Assignee: Livio, Inc., Royal Oak, MI (US)

( * ) Notice: Subject to any disclaimer, the term of this patent is extended or adjusted under 35 U.S.C. 154(b) by 355 days.

(21) Appl. No.: 14/320,972

(22) Filed: Jul. 1, 2014

(65) Prior Publication Data
US 2016/0004281 A1    Jan. 7, 2016

(51) Int. Cl.
| G06F 1/16 | (2006.01) |
| B60K 37/00 | (2006.01) |
| H04B 1/00 | (2006.01) |
| H04M 1/60 | (2006.01) |

(52) U.S. Cl.
CPC ............ *G06F 1/1698* (2013.01); *B60K 37/00* (2013.01); *G06F 1/1632* (2013.01); *H04B 1/00* (2013.01); *H04M 1/6083* (2013.01); *H04M 1/6091* (2013.01)

(58) Field of Classification Search
CPC ....... G06F 1/1632; G06F 1/1698; H04B 1/00; B60K 37/00
See application file for complete search history.

(56) References Cited

U.S. PATENT DOCUMENTS

| 7,715,790 | B1 * | 5/2010 | Kennedy | ........... H04M 1/72572 |
| | | | | 455/41.2 |
| 8,548,532 | B1 * | 10/2013 | Ng | .................. H04M 1/274516 |
| | | | | 381/150 |
| 8,626,144 | B2 | 1/2014 | Talty et al. | |
| 2001/0045774 | A1 * | 11/2001 | Rode | .................... B60N 2/0248 |
| | | | | 307/9.1 |
| 2008/0200209 | A1 * | 8/2008 | Cahoon | ................. B60R 25/045 |
| | | | | 455/557 |
| 2010/0161171 | A1 * | 6/2010 | Valentine | ............... B22D 11/12 |
| | | | | 701/31.4 |
| 2010/0198428 | A1 * | 8/2010 | Sultan | ................ G07C 9/00309 |
| | | | | 701/2 |

(Continued)

OTHER PUBLICATIONS

"Phone Holder," http://www.proclipusa.com/phone-holders/car-phone-holders.aspx, May 12, 2014.

(Continued)

*Primary Examiner* — Nimesh G Patel
(74) *Attorney, Agent, or Firm* — Jennifer M. Stec; Brooks Kushman P.C.

(57) ABSTRACT

A device dock of a vehicle may receive a one-time key over a data connection between the device dock and a vehicle computing system (VCS), and send the one-time key over a location-identifying connection to a nomadic device placed within proximity to the dock, to cause the nomadic device to send the one-time key to the VCS to integrate with the VCS as a driver device. The VCS may receive, from a nomadic device in a device dock, via a data connection between the VCS and the nomadic device, a one-time key provided from the VCS to the device dock over a data connection between the VCS and the device dock, and responsive to receipt of the one-time key from the nomadic device, integrate the nomadic device with the VCS as a driver device.

20 Claims, 6 Drawing Sheets

(56) References Cited

U.S. PATENT DOCUMENTS

| | | | |
|---|---|---|---|
| 2011/0137490 A1* | 6/2011 | Bosch | G08C 17/02 701/2 |
| 2011/0162035 A1* | 6/2011 | King | G06F 1/1632 726/1 |
| 2012/0030393 A1* | 2/2012 | Ganesh | G01C 21/265 710/303 |
| 2014/0163774 A1* | 6/2014 | Demeniuk | G08C 17/02 701/2 |
| 2015/0149042 A1* | 5/2015 | Cooper | B60R 16/037 701/48 |

OTHER PUBLICATIONS

Vlugt, Verifone, 2013, "Bluetooth Low Energy, Beacons and Retail."

* cited by examiner

DRIVER DEVICE DETECTION

TECHNICAL FIELD

The present disclosure generally relates to vehicle infotainment systems, and more particularly, to systems and methods of using a device dock for detection of which vehicle device is associated with the vehicle driver.

BACKGROUND

When a driver enters a vehicle with a device recognized by the vehicle, the vehicle may automatically pair with the device. Once paired, the device may have access to computing facilities of the vehicle. For safety purposes, if a device is associated with the driver, then that device may have certain functions locked out when the vehicle is in motion.

SUMMARY

In a first illustrative embodiment, a system includes a device dock of a vehicle configured to receive a one-time key over a data connection between the device dock and a vehicle computing system (VCS), and send the one-time key over a location-identifying connection to a nomadic device placed within proximity to the dock, to cause the nomadic device to send the one-time key to the VCS to integrate with the VCS as a driver device.

In a second illustrative embodiment, a system includes a vehicle computing system (VCS) configured to receive, from a nomadic device in a device dock, via a data connection between the VCS and the nomadic device, a one-time key provided from the VCS to the device dock over a data connection between the VCS and the device dock, and responsive to receipt of the one-time key from the nomadic device, integrate the nomadic device with the VCS as a driver device.

In a third illustrative embodiment, a system includes a nomadic device configured to connect to a vehicle computing system (VCS) via a first data connection, connect to a device dock via a location-identifying second data connection, receive a one-time key from the device dock over the location-identifying second data connection, and send the one-time key to the VCS over the first data connection to integrate with the VCS as a driver device.

DETAILED DESCRIPTION

Figure 1:
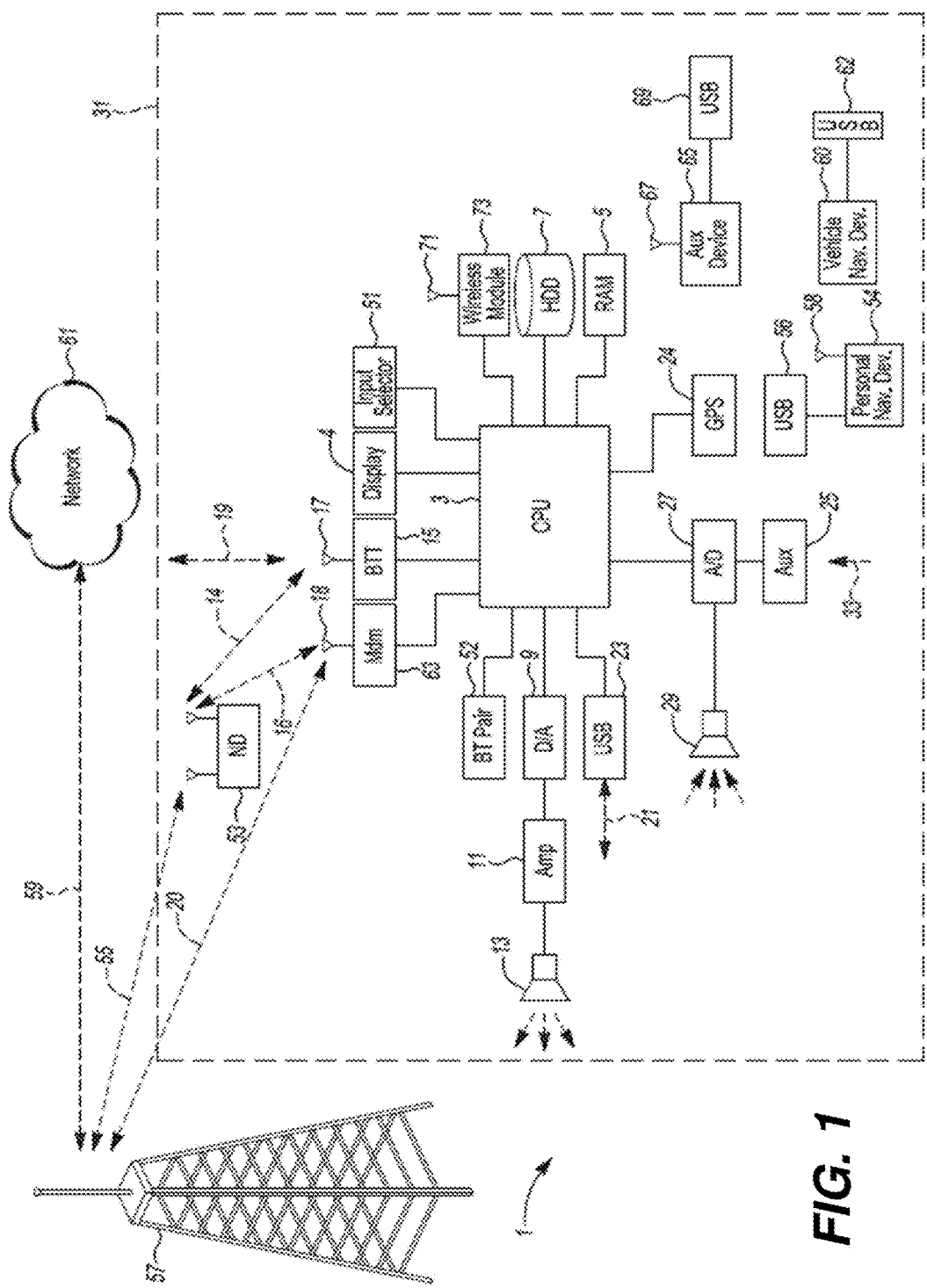
FIG. 1 is an exemplary block topology of a vehicle infotainment system implementing a user-interactive vehicle based computing system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

Upon identifying a driver's nomadic device within the vehicle, a vehicle based computing system (VCS) may be configured to perform various actions, such as loading user preferences corresponding to a user of the identified nomadic device and locking out input devices of the identified nomadic device. However, when multiple users carrying nomadic devices enter a vehicle, it may be difficult for the VCS to determine which nomadic device is the driver's device, and which device or devices belong to the passengers. For example, a husband and wife may both enter a vehicle, and both may be carrying devices that have been previously paired with the vehicle. Moreover it may be difficult for the VCS to determine that a typical driver of a vehicle has entered the vehicle as a passenger when carrying his or her device. In these and other situations, the VCS may be unable to automatically assume which device belongs to the driver. Moreover, it may be difficult for the VCS to determine whether a passenger and the driver have switched nomadic devices while in the vehicle, and whether the association of a device as being the driver nomadic devices should be changed based on the switch.

A device dock may be included in a vehicle to secure a nomadic device (such as a phone) in-place, and further to allow the VCS to identify the secured device as being the device of the driver. To allow the driver to dock his device, the location for the dock may be designed or placed within reach of the driver or driver seat. For instance, the dock may include one or more clips or magnets designed to hold the mobile device in place, along with sensors or other functionality to form a location-identifying connection to a docked device. In an example, the location-identifying connection may be a short-range connection formed between the docked device and the dock using a near-field communication (NFC) sensor of the dock or via a wired connection from the dock. As another example, the location-identifying connection may be formed using a Bluetooth Low Energy (BLE) sensor of the dock, where the relative device location may be determined according to Bluetooth signal strength received by the dock from the nomadic device. Using the location-identifying connection, the device dock may be configured to detect when the nomadic device is in-place.

To allow the device dock to aid in determining the identity of the nomadic device, the dock may request a one-time key from the VCS, where the one-time key may be provided to the docked mobile device via the location-identifying connection. The docked mobile device may then provide the one-time key to the VCS over another data connection to the VCS, such as via a Bluetooth or WiFi data channel to the VCS, such that the VCS may understand which device is currently docked, and may automatically connect the docked device to the VCS as the driver device. When other devices connect to the VCS over data connections, as those devices do not have the one-time key, they may automatically be connected to the VCS as passenger devices.

Accordingly, the VCS may be configured to associate the docked device with the VCS as driver device (e.g., to load the proper user settings and lock associated device input devices). Thus, by way of the device dock, the VCS of the vehicle may be able to quickly and easily identify which nomadic device should be selected for association with the vehicle as the driver nomadic device. Moreover, if a vehicle occupant wishes to change which nomadic device is selected as being the associated device, the occupant may simply undock the current device and dock the other device, causing the VCS to remove the old driver integration and integrate with that other nomadic device as being the driver's.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
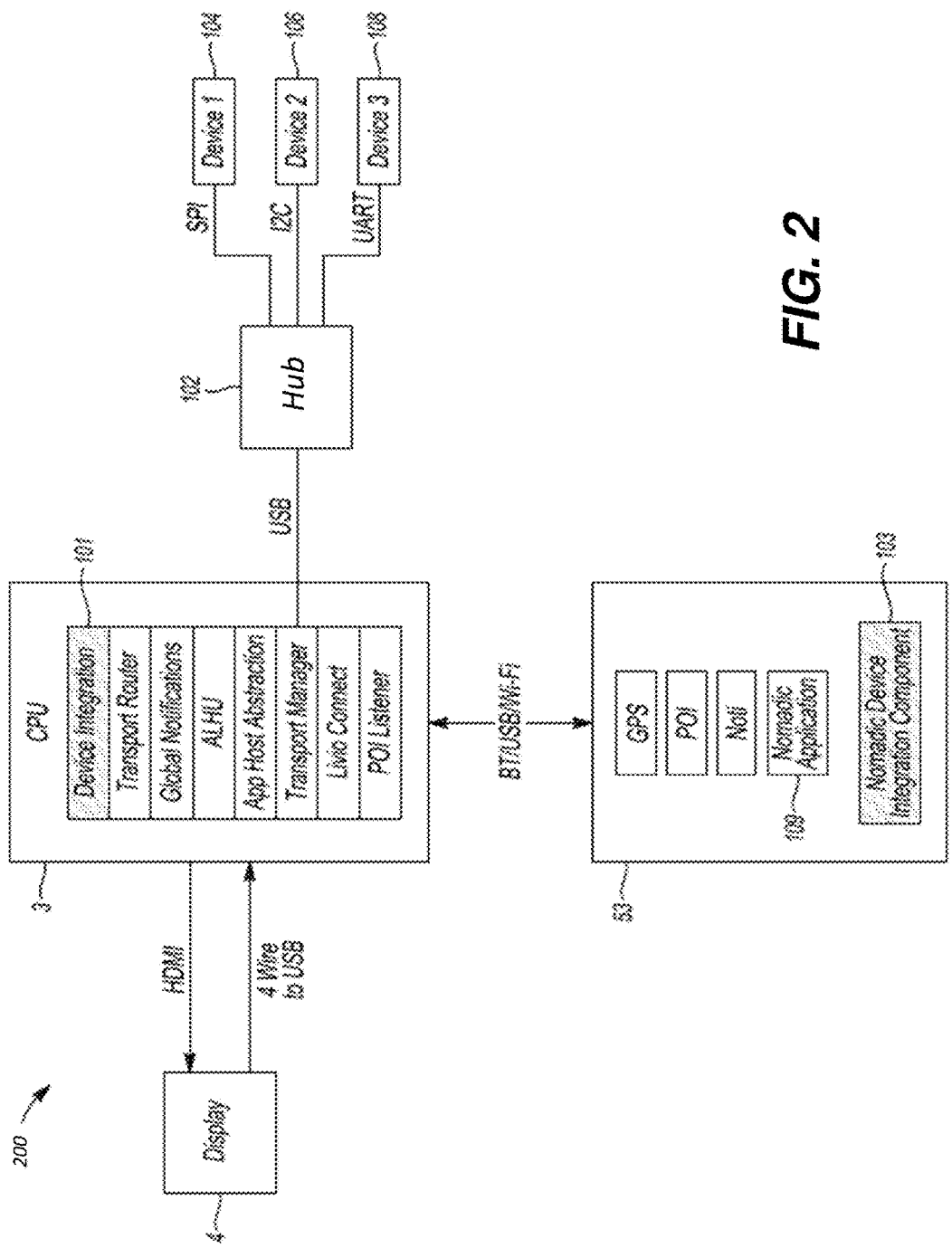
FIG. 2 is an exemplary block topology of an example system for integrating one or more nomadic devices with the vehicle based computing system.

FIG. 2 is an exemplary block topology of a system 200 for integrating one or more connected devices with the vehicle based computing system 1 (VCS). To facilitate the integration, the CPU 3 may include a device integration framework 101 configured to provide various services to the connected devices. These services may include transport routing of messages between the connected devices and the CPU 3, global notification services to allow connected devices to provide alerts to the user, application launch and management facilities to allow for unified access to applications executed by the CPU 3 and those executed by the connected devices, and point of interest location and management services for various possible vehicle 31 destinations.

As mentioned above, the CPU 3 of the VCS 1 may be configured to interface with one or more nomadic devices 53 of various types. The nomadic device 53 may further include a device integration client component 103 to allow the nomadic device 53 to take advantage of the services provided by the device integration framework 101. Applications executed by the nomadic device 53 may accordingly utilize the device integration client component 103 to interact with the CPU 3 via the device integration framework 101. As one example, a music player application on the nomadic device 53 may interact with the CPU 3 to provide streaming music through the speaker 13 or stereo system output of the VCS 1. As another example, a navigation application on the nomadic device 53 may interact with the CPU 3 to provide turn-by-turn directions for display on the screen 4 of the VCS 1.

The multiport connector hub 102 may be used to interface between the CPU 3 and additional types of connected devices other than the nomadic devices 53. The multiport connector hub 102 may communicate with the CPU 3 over various buses and protocols, such as via USB, and may further communicate with the connected devices using various other connection buses and protocols, such as Serial Peripheral Interface Bus (SPI), Inter-integrated circuit (12C), and/or Universal Asynchronous Receiver/Transmitter (UART). The multiport connector hub 102 may further perform communication protocol translation and interworking services between the protocols used by the connected devices and the protocol used between the multiport connector hub 102 and the CPU 3. The connected devices may include, as some non-limiting examples, a radar detector 104, a global position receiver device 106, and a storage device 108.

Figure 3A:
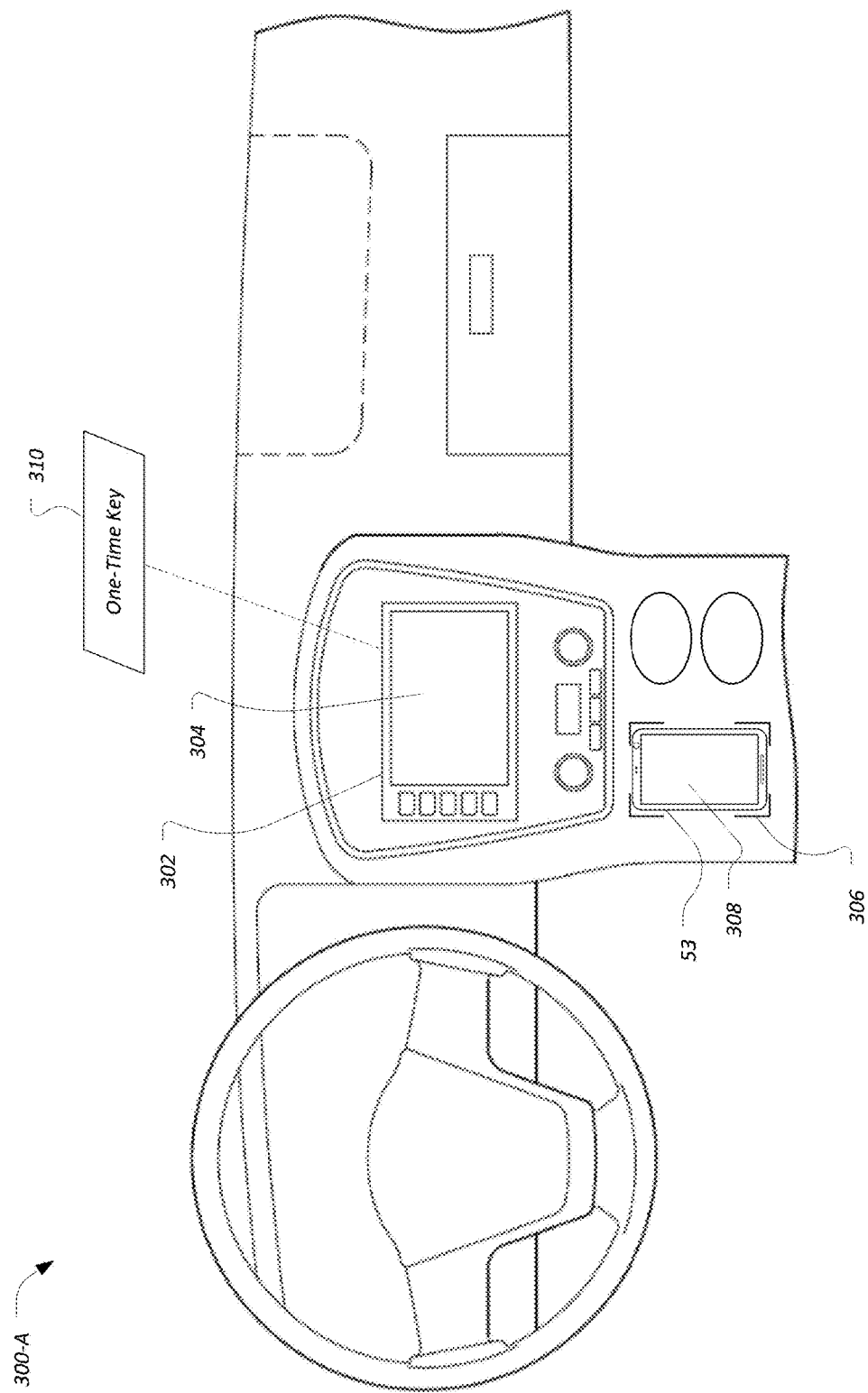
FIG. 3A is an illustrative example of a portion of a vehicle including a device dock configured for identification of driver nomadic devices with the vehicle based computing system.
Figure 3B:
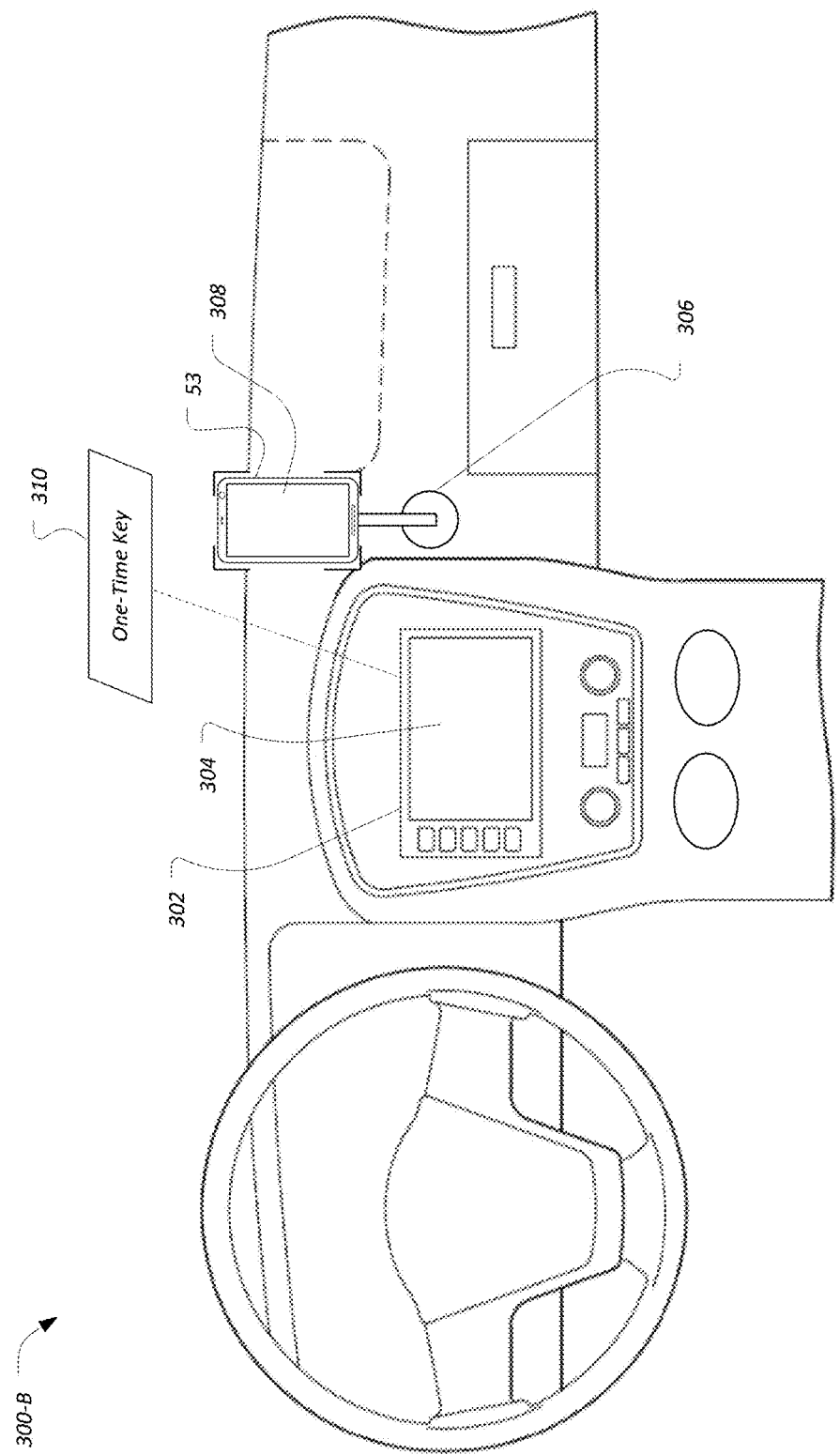
FIG. 3B is an alternate illustrative example of a portion of a vehicle including a device dock configured for identification of driver nomadic devices with the vehicle based computing system.

FIG. 3A is an illustrative example of a portion 300-A of a vehicle 31 including a device dock 306 configured for identification of driver nomadic devices 53 with the VCS 1. As illustrated, the vehicle include a head unit 302 mounted in a relatively centralized control area between the driver and front passenger seats and configured to include a display 304, as well as the device dock 306 integrated with the vehicle 31 and located within the vehicle 31 within reach of the driver. FIG. 3B is an alternate illustrative example of a portion 300-B of a vehicle 31 including a device dock 306 configured for identification of driver nomadic devices 53 with the VCS 1. As compared to the device dock 306 integrated with the vehicle 31 as illustrated in FIG. 3A, the device dock 306 illustrated in FIG. 3B includes a dock adapter device dock 306 installed to the vehicle 31. It should be noted that these examples are merely exemplary, and other vehicle or VCS 1 layouts may be utilized as well.

When a nomadic device 53 is paired with the VCS 1, the VCS 1 may be able to perform certain actions based on the recognition. These actions may include, for example, loading vehicle user preferences associated with the user of that nomadic device 53. The identified nomadic device 53 may also be provided with access to certain features of the VCS 1, such as to provide information on the display 304. Moreover, the nomadic device 53 associated with the VCS 1 as the driver device may have certain functions locked out when the vehicle is in motion. For example, input using a touch screen input device 308 of the nomadic device 53 may be disabled on the paired nomadic device 53. Other nomadic devices 53 within the vehicle may avoid function lockout, but may not be able to affect vehicle user preferences or access the features of the VCS 1.

Presence of nomadic devices 53 within the vehicle may be detected by the VCS 1 by using the BLUETOOTH transceiver 15, or some other sensor of the vehicle capable of detecting the presence of nomadic devices 53. The VCS 1 may further maintain a listing of previously associated nomadic devices 53, and may filter the list of detected nomadic devices 53 to include only those devices on the previously associated list.

If no nomadic devices 53 are detected by the VCS 1, or if no detected nomadic devices 53 that have previously associated with the VCS 1 are identified, then the VCS 1 may determine to not associate with any nomadic devices 53. In such a situation, the VCS 1 may provide a prompt on the display 304 that no known nomadic devices 53 have been located, or a prompt on the display 304 inviting the user to associate a new nomadic device 53 with the vehicle 31. However, when the VCS 1 detects that one or more nomadic devices 53 that have previously been associated with the VCS 1 are within the vehicle 31, it may be difficult for the vehicle 31 to determine which nomadic device 53 should be associated with the VCS 1 as the driver device. For example, a husband and wife may both enter a family vehicle 31, and both may be carrying nomadic devices 53 that have previously been paired with the VCS 1. As another example, the husband may enter the vehicle 31 as passenger, with no other nomadic devices 53 known to the vehicle 31 being present. In such a situation, the VCS 1 may require additional information in order to identify which of the nomadic devices 53 (if any) should be associated with the VCS 1 as the driver device.

To identify a more localized presence of a nomadic device 53 within the device dock 306, the device dock 306 may include one or more device sensors configured, for example, to detect near field communications (NFC) or BLUETOOTH low energy (BLE) communications from a nomadic device 53 placed in their near vicinity. The device dock 306 may be located at a location of the vehicle cabin within the reach of the vehicle occupants (e.g., within reach of the driver selecting his or her nomadic device 53), and may facilitate the detection of nomadic devices 53 placed within close proximity to the device dock 306 location (e.g., on the order of approximately 0-0.2 meters). For instance, the device dock 306 may make use of BLE distance measurement functionality to detect whether the nomadic device 53 is within the device dock 306. In other examples, the device dock 306 may detect presence of the nomadic device 53 by way of a wired connection from the device dock 306 to the docked nomadic device 53.

The device dock 306 may additionally be connected to the VCS 1 over a data connection. In some cases, e.g., such as for the integrated device dock 206 illustrated in FIG. 3A, the connection between the device dock 306 and the VCS 1 may be a wired connected integrated into the vehicle 31. In other cases, e.g., such as for the installed device dock 206 illustrated in FIG. 3B, the connection between the device dock 306 and the VCS 1 may be a wireless connection (e.g., via Bluetooth or WiFi) independent of wireless connections between the VCS 1 and the nomadic devices 53.

The device dock 306 may be configured to receive one-time key 310 information from the VCS 1. The one-time key 310 may be a random number or other value that may be used by the VCS 1 to identify which nomadic device 53 is the driver's. The VCS 1 may be configured to generate the one-time key 310, and provide the generated one-time key 310 to the device dock 306.

The device dock 306 may be configured to detect the presence of the nomadic device 53. As some examples, the device dock 306 may detect presence of the nomadic device 53 via a short-range connection such as a NFC connection or a wired connection, or by determining relative signal strength over a connection such as BLE. If the nomadic device 53 is detected, the device dock 306 mat be configured to provide the nomadic device 53 with the one-time key 310. The nomadic device 53 may, in turn, provide the one-time key 310 to the VCS 1 to indicate to the VCS 1 that the nomadic device 53 should be connected to the VCS 1 as the driver device 53. The communication between the VCS 1 and the device dock 306 may be via various communications methods and protocols, such as via a wireless connection such as via BLUETOOTH, or via a hard-wired connection between the VCS 1 and the device dock 306.

The device dock 306 may be further configured to, upon loss of detection of the nomadic device 53, inform the VCS 1 that the nomadic device 53 should no longer be connected to the VCS 1 as the driver device 53. The VCS 1 may be configured to regenerate the one-time key 310 (e.g., upon VCS 1 initialization, upon use by a nomadic device 53) to prevent multiple nomadic devices 53 attempting to claim connection as the driver device 53. Further aspects of the operation of the device dock 306 are discussed in detail with respect to FIGS. 4-7 below.

Figure 4:
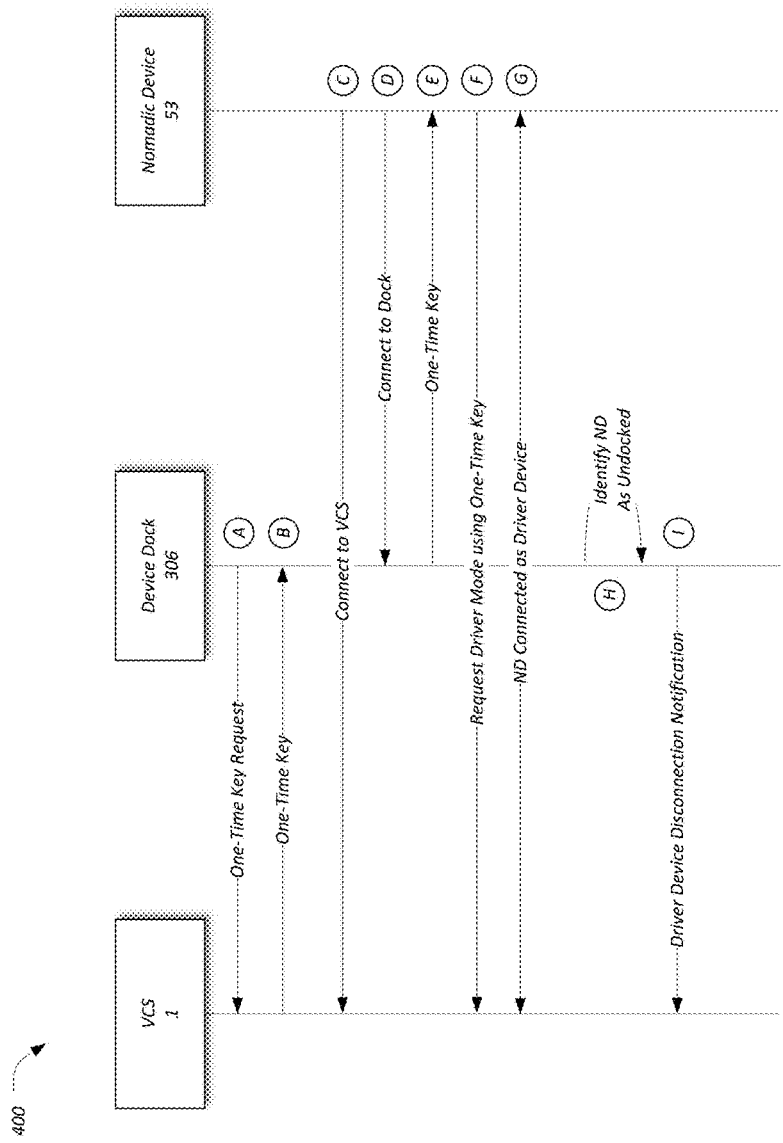
FIG. 4 illustrates an exemplary data flow for identification of driver nomadic devices by the vehicle based computing system via the device dock.

FIG. 4 illustrates an exemplary data flow 400 for identification of driver nomadic devices 53 by the VCS 1 via the device dock 306. At time index (A), the device dock 306 sends a request to the VCS 1 for a one-time key 310. At time index (B), the VCS 1 responds to the request by providing the one-time key 310 to the device dock 306. At time index (C), the nomadic device 53 connects to the VCS 1, e.g., based on detection of presence of the nomadic device 53 by the VCS 1 by using the BLUETOOTH transceiver 15. At time index (D), the nomadic device 53 connects to the device dock 306 over a location-identifying connection. As some examples, the device dock 306 may detect presence of the nomadic device 53 via a short-range connection such as a NFC connection or a wired connection, or by determining relative signal strength over a connection such as BLE. At time index (E), responsive to detection of the nomadic device by the device dock 306, the device dock 306 provides the one-time key 310 to the nomadic device 53 over the location-identifying connection. At time index (F), the nomadic device 53 provides the one-time key 310 to the VCS 1, to inform the VCS 1 that the nomadic device 53 is the driver nomadic device 53. At time index (G), the VCS 1 integrates with the nomadic device 53 as the driver nomadic device 53. For example, the VCS 1 may be configured to load the user settings associated with the driver nomadic device 53 and lock the input devices of the driver nomadic device 53. Thus, by way of the device dock 306, the VCS 1 may be able to quickly and easily identify which nomadic device 53 should be selected for association with the vehicle 31 as the driver nomadic device 53.

At time index (H), the device dock 306 identifies that the nomadic device 53 is removed from the device dock 306. This may occur, for example, if the driver no longer wishes to maintain the integration of the nomadic device 53 with the VCS 1, or to switch which nomadic device 53 is integrated with the VCS 1 as the driver device. At time index (I), responsive to the identification, the device dock 306 may provide a notification message to the VCS 1 informing the VCS 1 of the disconnection. Responsive to the notification message, the VCS 1 may remove the integration with the nomadic device 53 as the driver nomadic device 53.

Variations on the data flow 400 are possible. As one possibility, the device dock 306 may defer requesting the VCS 1 for the one-time key 310 until after detection of a nomadic device 53 connecting to the device dock 306. As another possibility, the nomadic device 53 and the VCS 1 may not connect until after the nomadic device 53 receives the one-time key 310 from the device dock 306.

Figure 5:
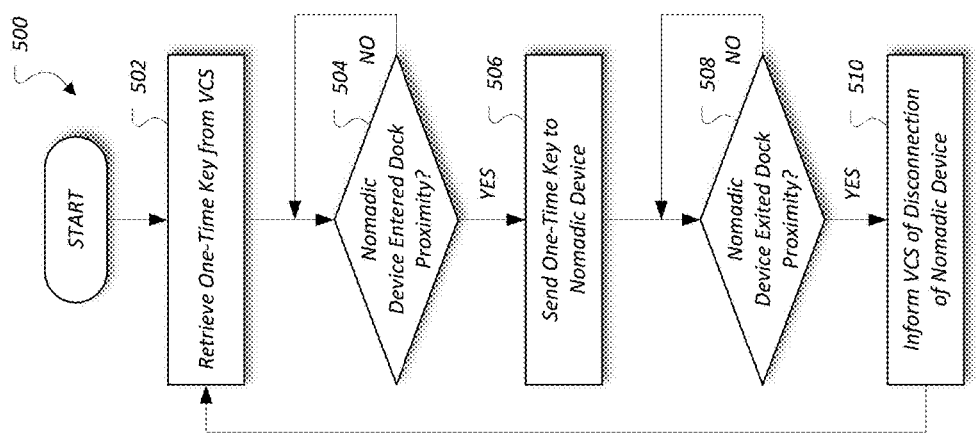
FIG. 5 illustrates an exemplary process for identifying nomadic devices to be associated with the vehicle based computing system as the driver device.

FIG. 5 illustrates an exemplary process 500 for identifying nomadic devices 53 to be associated with the VCS 1 as the driver device 53. The process 500 may be performed, for example, by the device dock 306 in communication with the VCS 1.

At operation 502, the device dock 306 receives the one-time key 310 from the VCS 1. For example, the device dock 306 may send a request to the VCS 1 to receive the one-time key 310 and may receive the one-time key 310 from the VCS 1. The communication between the VCS 1 and the device dock 306 may be via various communications methods and protocols, such as via a wireless connection such as via BLUETOOTH, or via a hard-wired connection between the VCS 1 and the device dock 306.

At operation 504, the device dock 306 determines whether the nomadic device 53 entered proximity to the device dock 306. For example, the device dock 306 may form a location-identifying connection to the nomadic device 53 to detect the presence of the nomadic device 53, e.g., via NFC sensors, BLE sensors, wired connection, or the like. If the device dock 306 detects connection of the nomadic device 53 to the device dock 306 via location-identifying connection, control passes to operation 506. Otherwise, control remains at operation 504.

At operation 506, the device dock 306 sends the one-time key 310 to the nomadic device 53 over the location-identifying connection. The nomadic device 53 may accordingly use the one-time key 310 to register with the VCS 1 as the driver nomadic device 53.

At operation 508, the device dock 306 determines whether the nomadic device 53 disconnected. For example, the device dock 306 may detect lack of presence of the nomadic device 53 via NFC, BLE, wired connection, or the like. If the device dock 306 detects disconnection of the nomadic device 53 from the device dock 306 (e.g., termination of the location-identifying connection, an increase in distance from the nomadic device 53 to the device dock 306, etc.), control passes to operation 510. Otherwise, control remains at operation 506.

At operation 510, the device dock 306 informs the VCS 1 that the nomadic device 53 has disconnected from the device dock 306. The VCS 1 may accordingly unregister the nomadic device 53 as the driver nomadic device 53. After operation 510, control passes to operation 502 to receive a new one-time key 310.

Figure 6:
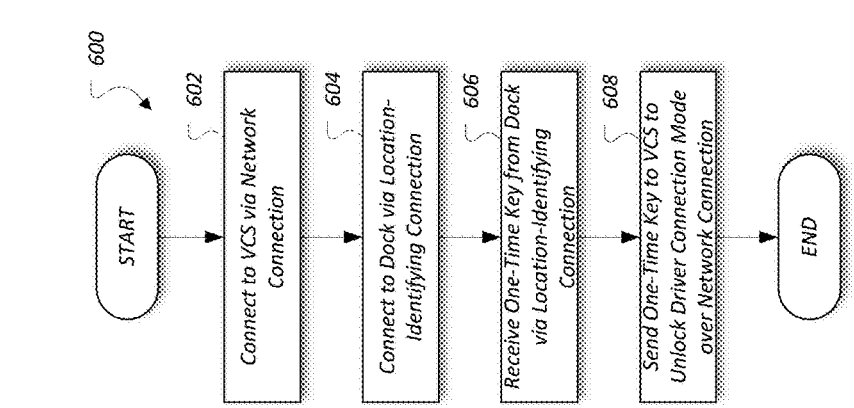
FIG. 6 illustrates an exemplary process performed by the nomadic device for identifying itself for association with the vehicle based computing system as the driver nomadic device.

FIG. 6 illustrates an exemplary process 600 performed by the nomadic device 53 for identifying itself for association with the VCS 1 as the driver nomadic device 53. The process 500 may be performed, for example, by the nomadic device 53 brought into the vehicle 31 by the driver.

At operation 602, the nomadic device 53 connects to the VCS 1. For example, the nomadic device 53 may utilize a BLUETOOTH transceiver of the nomadic device 53 to connect to the BLUETOOTH transceiver 15 of the VCS 1.

At operation 604, the nomadic device 53 connects to the device dock 306. For example, upon placement by the driver into the device dock 306, the nomadic device 53 may utilize a location-identifying connection device of the nomadic device 53 (e.g., a BLE or NFC transceiver, a wired connector) to connect to the device dock 306 via a location-identifying connection.

At operation 606, the nomadic device 53 receives the one-time key 310 from the device dock 306. For example, responsive to connection of the nomadic device 53, the nomadic device 53 may receive the one-time key 310 from the device dock 306 over the location-identifying connection.

At operation 608, the nomadic device 53 provides the one-time key 310 to the VCS 1. The VCS 1 may accordingly register the nomadic device 53 as the driver nomadic device 53. After operation 608, the process 600 ends.

Figure 7:
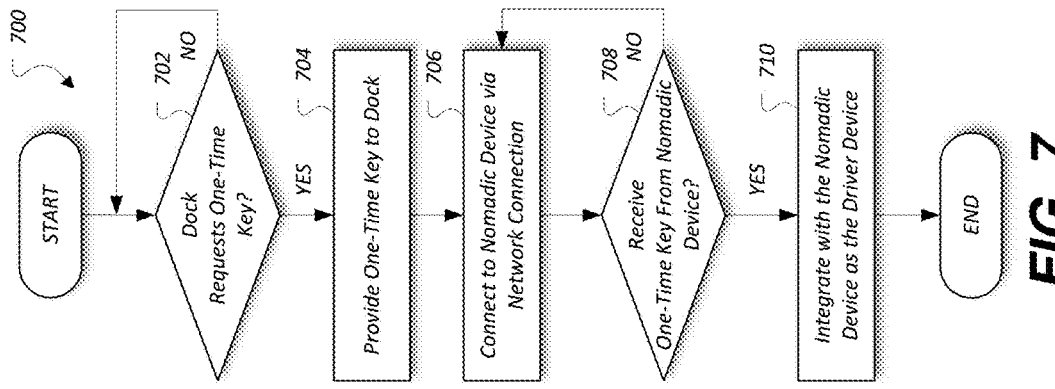
FIG. 7 illustrates an exemplary process performed by the vehicle based computing system for identifying nomadic devices to be associated with the vehicle based computing system as the driver device.

FIG. 7 illustrates an exemplary process 700 performed by the VCS 1 for identifying nomadic devices to be associated with the VCS 1 as the driver device. The process 700 may be performed, for example, by a CPU 3 of a VCS 1 of a vehicle 31. In other embodiments, the process 700 may be implemented in other controllers, or distributed amongst multiple controllers.

At operation 702, the VCS 1 determines whether the device dock 306 requests the one-time key 310. For example, the VCS 1 and the device dock 306 may be connected via various communications methods and protocols, such as via a wireless connection such as via BLU- ETOOTH, or via a hard-wired connection between the VCS 1 and the device dock 306. Over the connection, the VCS 1 may determine whether the VCS 1 has received a request from the device dock 306 for the one-time key 310.

At operation 704, the VCS 1 provides the one-time key 310 to the device dock 306. For example, the VCS 1 may generate the one-time key 310, e.g., as a random value, and may provide the one-time key 310 to the device dock 306 over the connection to the device dock 306.

At operation 706, the VCS 1 connects to the nomadic device 53. For example, the VCS 1 may utilize the BLUETOOTH transceiver 15 of the VCS 1 to connect to a BLUETOOTH transceiver of the nomadic device 53.

At operation 708, the VCS 1 determines whether the proper one-time key 310 is received from the nomadic device 53. For example, the VCS 1 may receive the one-time key 310 from the nomadic device 53 over the connection to the VCS 1, where the one-time key 310 was provided to the nomadic device 53 via the location-identifying connection to the device dock 306. If the correct one-time key 310 is received, control passes to operation 710. Otherwise, control passes to operation 706 to await a connection by an authorized nomadic device 53 having the correct one-time key 310.

At operation 710, the VCS 1 integrates with the nomadic device 53 as the driver nomadic device 53. For example, the VCS 1 may be configured to load the user settings associated with the driver nomadic device 53 and lock the input devices of the driver nomadic device 53. Thus, by way of the device dock 306, the VCS 1 may be able to quickly and easily identify which nomadic device 53 should be selected for association with the vehicle 31 as the driver nomadic device 53. After operation 710, the process 700 ends.

Referring again to FIGS. 5-7, the vehicle 31 and its components illustrated in FIGS. 1-6 are referenced throughout the discussion of the processes 500-700 to facilitate understanding of various aspects of the present disclosure. The processes 500-700 may be implemented through a computer algorithm, machine executable code, or software instructions programmed into a suitable programmable logic device(s) of the vehicle, such as the vehicle control module, the hybrid control module, another controller in communication with the vehicle computing system, or a combination thereof. Although the various steps shown in the process 500-700 appear to occur in a chronological sequence, at least some of the steps may occur in a different order, and some steps may be performed concurrently or not at all.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system comprising:
    a vehicle device dock configured to
        receive a one-time key over a data connection between the device dock and a vehicle computing system (VCS), and
        send the one-time key over a location-identifying connection to a nomadic device in proximity to the dock, to cause the nomadic device to send the one-time key to the VCS over a connection other than the location-identifying connection to integrate with the VCS as a driver device.

2. The system of claim 1, wherein the location-identifying connection is one of a Bluetooth low energy connection, a near-field communication connection and a wired connection.

3. The system of claim 1, wherein the device dock is further configured to determine whether the nomadic device is placed within proximity to the dock based on wireless signal strength over the location-identifying connection.

4. The system of claim 1, wherein the device dock is further configured to:
    identify, according to the location-identifying connection, that the nomadic device exited the proximity to the dock, and
    inform the VCS over the data connection between the device dock and the VCS that the nomadic device is no longer the driver device.

5. The system of claim 4, wherein the device dock is further configured to identify that the nomadic device exited the proximity to the dock according to at least one of disconnection of the nomadic device from the location-identifying connection and wireless signal strength over the location-identifying connection.

6. The system of claim 1, wherein the device dock is further configured to send a message over the data connection to the VCS requesting the one-time key, and wherein the one-time key is received by the device dock responsive to the request.

7. The system of claim 6, wherein the device dock is further configured to send the message requesting the one-time key responsive to detection of the nomadic device placed within proximity to the dock.

8. The system of claim 1, wherein the device dock is integrated into at least one of a dash of the vehicle, a center console of the vehicle, and a center stack of the vehicle.

9. A system comprising:
    a vehicle computing system (VCS) configured to
        receive, from a nomadic device in a device dock, via a data connection between the VCS and the nomadic device, a one-time key provided from the VCS to the device dock over a second data connection between the VCS and the device dock, and
        responsive to receipt of the one-time key from the nomadic device, integrate the nomadic device with the VCS as a driver device.

10. The system of claim 9, wherein the VCS is further configured to:
    receive, over the data connection from the device dock, a request for the one-time key, and
    provide the one-time key to the device dock responsive to the request.

11. The system of claim 9, wherein the VCS is further configured to:
    receive over the data connection from the device dock, an indication that the nomadic device is disconnected from the device dock, and
    responsive to receipt of the indication, remove integration of the nomadic device with the VCS as the driver device.

12. The system of claim 9, wherein to integrate the nomadic device with the VCS as the driver device includes at least one of (i) to load driver preferences corresponding to a user profile associated with the nomadic device, and (ii) to request the nomadic device to lock at least one input device of the nomadic device.

13. The system of claim 9, wherein the data connection between the VCS and the nomadic device includes one of a Bluetooth connection and a universal serial bus (USB) connection.

14. The system of claim 9, wherein the VCS is further configured to generate the one-time key.

15. The system of claim 9, wherein the VCS is further configured to compare the one-time key received from the nomadic device with a copy of the one-time key maintained by the VCS to determine whether the VCS has received the one-time key from the nomadic device.

16. A system comprising:
    a nomadic device configured to
        connect to a vehicle computing system (VCS) via a first data connection,
        connect to a device dock via a location-identifying second data connection,
        receive a one-time key from the device dock over the location-identifying second data connection, and
        send the one-time key to the VCS over the first data connection to integrate with the VCS as a driver device.

17. The system of claim 16, wherein the location-identifying second connection is one of a Bluetooth low energy connection and a near-field communication connection.

18. The system of claim 16, wherein to integrate with the VCS as the driver device includes at least one of (i) to load driver preferences corresponding to a user profile associated with the nomadic device, and (ii) to request the nomadic device to lock at least one input device of the nomadic device.

19. The system of claim 16, wherein the first data connection between the VCS and the nomadic device includes one of a Bluetooth connection and a universal serial bus (USB) connection.

20. The system of claim 16, wherein the nomadic device is a mobile phone.

* * * * *